United States Patent
Rivera

(12) 
(10) Patent No.: US 6,302,097 B1
(45) Date of Patent: Oct. 16, 2001

(54) COMBINATION COLLAPSIBLE BARBECUE GRILL AND FOLDING TABLE

(76) Inventor: George Rivera, 4305 N. Sunflower, Covina, CA (US) 91724

(*) Notice: Subject to any disclaimer, the term of this patent is extended or adjusted under 35 U.S.C. 154(b) by 0 days.

(21) Appl. No.: 09/596,368

(22) Filed: Jun. 19, 2000

(51) Int. Cl.[7] .................................................... F24C 5/20
(52) U.S. Cl. .................. 126/38; 126/41 R; 126/305; 126/9 R; 248/150; 248/151
(58) Field of Search ........................... 126/38, 9 R, 41 R, 126/50, 305, 304 R, 304 A, 39 B, 25 R; 248/150, 151; 312/236

(56) References Cited

U.S. PATENT DOCUMENTS

| | | | |
|---|---|---|---|
| 1,448,900 | * | 3/1923 | Moats ....................................... 126/38 |
| 1,478,371 | * | 12/1923 | Albrighton ............................... 126/38 |
| 1,575,931 | * | 3/1926 | Higham .................................... 126/38 |
| 1,582,346 | * | 4/1926 | Oster ........................................ 126/38 |
| 1,626,035 | * | 4/1927 | Hanson .................................... 126/38 |
| 2,020,503 | * | 11/1935 | Hanson et al. ..................... 126/304 A |

* cited by examiner

*Primary Examiner*—James C. Yeung
(74) *Attorney, Agent, or Firm*—Morland C. Fischer

(57) ABSTRACT

A combination barbecue grill and folding table that is adapted to be manipulated from a fully deployed condition, during which food can be cooked on the grill and then served on an adjacent table, and a collapsed condition, during which the grill and table are folded into a compact package that is suitable for transport and storage. The barbecue grill is removably received at the top of a cooking stand, and a plurality of fold-up legs extend downwardly from the cooking stand to support the cooking stand above the ground. According to one embodiment of the invention, a pair of table members are hingedly connected end-to-end one another. The first table member is rotated towards and over the top of the cooking stand, and the second table member is then rotated over the first table member to establish a compact package. In a second embodiment, first and second table members are pivotally connected to opposite sides of the cooking stand. The first table member is rotated towards and over a first half of the top of the cooking stand, and the second table member is then rotated towards and over the second half of the top of the cooking stand to establish another compact package.

9 Claims, 7 Drawing Sheets

COMBINATION COLLAPSIBLE BARBECUE GRILL AND FOLDING TABLE

BACKGROUND OF THE INVENTION

1. Field of the Invention

This invention relates to a combination barbecue grill and folding table that is adapted to be manipulated from a fully deployed condition, during which food can be cooked on the grill and then served on an adjacent table, and a collapsed condition, during which the grill and table are folded into a compact package that is suitable for transport and storage.

2. Background Art

Families seeking recreation often choose to go camping or simply have a cookout. However, such out of doors activities can be complicated by the need to find a camp site, a table and an available barbecue grill upon which to cook food. Consequently, in some cases, campers are required to carry with them bulky and space consuming cooking equipment. In other cases, the campers must set up their cooking site far from their motor vehicle which increases inconvenience and leaves the family's vehicle unattended during the cookout. In still other cases, the family may be subjected to a waste of time and/or disappointment, particularly during a holiday or at the peak of the outdoor camping season, if it is unable to find an outdoor grill which is available for use.

In order to overcome the aforementioned problem and potential inconveniences as described above, it would be desirable to have available a compact, easy to use, easy to transport combination barbecue grill and table which may be carried in a motor vehicle and deployed adjacent to the vehicle so that food can be cooked and served without first having to locate a camp site at which a barbecue grill and table are available.

Examples of known portable food cooking equipment is available by referring to one or more of the following United States patents:

U.S Pat. No. 1,626,035 Apr. 26, 1927
U.S. Pat. No. 1,638,223 Aug. 9, 1927
U.S. Pat. No. 2,944,862 Jul. 12, 1960
U.S. Pat. No. 5,293,859 Mar. 15, 1994
U.S. Pat. No. 5,588,355 Dec. 31, 1996

SUMMARY OF THE INVENTION

In general terms, a combination collapsible folding table and barbecue grill are disclosed that is adapted to be manipulated between a fully deployed condition, during which food can be cooked on a grill and then served on an adjacent table, and a collapsed condition, during which the grill and table may be folded into a compact package that is suitable for transport and storage. The combination includes a cooking stand having a rectangular base within which the barbecue grill is removably received when it is desirable to cook food.

According to a first embodiment of the invention, pairs of telescoping and rotatable legs are pivotally coupled to opposite sides of the cooking stand. A first table member of the folding table is pivotally connected to the back of the cooking stand, and the second table member is pivotally connected to the first table member such that the first and second table members are held together in end-to-end alignment with one another. Another pair of telescoping and rotatable legs are pivotally coupled to opposite sides of the second table member to support the folding table above the ground so that one or more chairs can fit thereunder. To manipulate the combination barbecue grill and folding table of the first embodiment to the collapsed condition, the telescoping legs that support the cooking stand are first pushed inwardly and then rotated below the cooking stand. Similarly, the telescoping legs that support the folding table are pushed inwardly and then rotated below the second table member. At this point, the first table member of the folding table is rotated towards and over the top of the cooking stand. The second table member is then rotated over the top of the first table member, whereby the first and second table members of the folding table are now arranged in a space conserving face-to-face alignment one above the other. Moreover, the legs of the combination are neatly stowed below the cooking stand and the first table member so as to achieve a compact package.

According to a second embodiment, a telescoping and rotatable leg is pivotally connected to each corner of the cooking stand. A first table member of the folding table is pivotally connected to a first side of the cooking stand, and a second table member is pivotally connected to the opposite side. To manipulate the combination barbecue grill and folding table of the second embodiment to the collapsed condition, the telescoping legs are first pushed inwardly and then rotated to positions along the opposite sides of the cooking stand below the respective first and second table members. The first table member is rotated towards and over the top of a first half of the cooking stand, and the second table member is then rotated towards and over the top of the second half of the cooking stand, whereby the first and second table members are now arranged in a space conserving side-by-side alignment with the legs neatly stowed below the table members so as to achieve a compact package.

DETAILED DESCRIPTION

Figure 1:
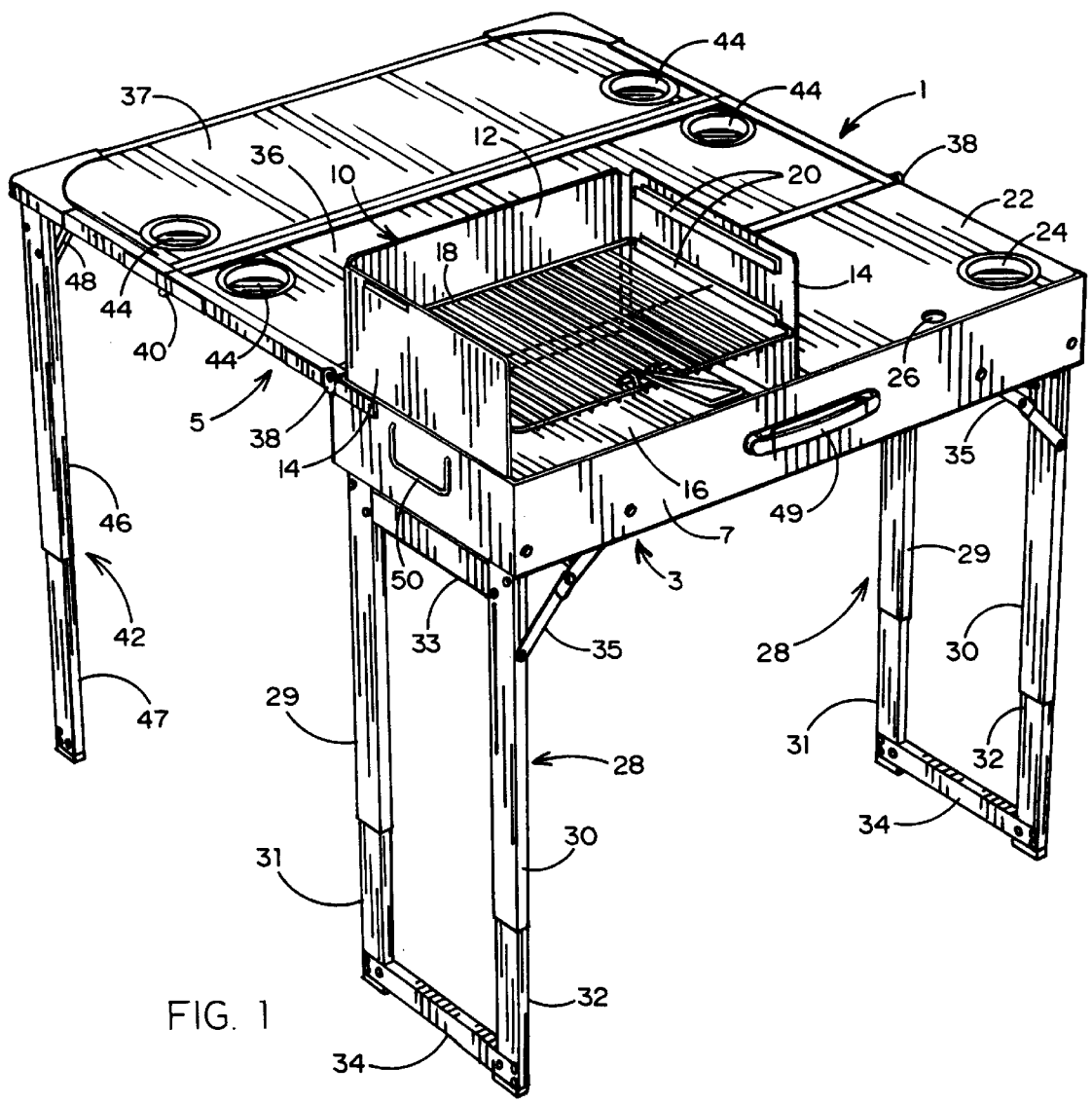
FIG. 1 shows a first embodiment for a combination collapsible barbecue grill and folding table in a deployed condition ready for use.

A first embodiment for the collapsible combination 1 of a folding table 5 and a barbecue grill 10 is described while referring initially to FIGS. 1–4 of the drawings. As will be described in greater detail, the combination 1 is adapted to be manipulated between a fully deployed condition (as best shown in FIG. 1), during which food can be cooked on a grill 10 at a cooking stand 3 and then served on an adjacent table 5, and a collapsed condition (best shown in FIG. 2), during which the cooking stand 3 and table 5 are folded into a compact package that is suitable for transport and storage.

Referring first to the fully deployed condition of FIG. 1, the combination 1 is shown ready to use at a picnic, campsite, or the like, where food can be cooked and served in an out-of-doors environment. The cooking stand 3 includes a rectangular base 7 having grilling and food preparation stations at opposite sides thereof. Located at the grilling station of the base 7 of cooking stand 3 is a barbecue grill 10. The barbecue grill 10 includes an upstanding back wall 12, a pair of upstanding side walls 14 and a tray 16 which lies below and is connected to each of the upstanding back and side walls 12 and 14. The grill 10 also includes a gridiron 18 upon which the food to be cooked is laid and grilled. The gridiron 18 is removably attached to an opposing pair of receptacles 20 from a plurality of pairs of receptacles at opposite sides 14 of grill 10 so as to be spaced above the tray 16. The elevation of the gridiron 18 above the tray 16 can be varied depending upon the temperature at which the food is to be cooked and the corresponding pair of receptacles 20 to which the gridiron 18 is removable attached.

In the deployed condition of FIG. 1, the gridiron 18 of grill 10 is surrounded by the back and side walls 12 and 14. However, prior to the combination folding table 5 and barbecue grill 10 being manipulated to the collapsed condition of FIG. 2, the grill 10 is removed from the base 7 of cooking stand 3. That is to say, the tray 16 and the back and side walls 12 and 14 which project upwardly therefrom are simply lifted as a unit out of the base 7 of cooking stand 3. For the purpose of convenience, and as is best shown in FIG. 3, the gridiron 18 may be returned to the base 7 to be carried and stored therewithin when the combination 1 is in the collapsed condition.

Located at the food preparation station of the base 7 of cooking stand 3 adjacent the barbecue grill 10 is a flat shelf 22. The shelf 22 offers the convenience of an area near the grill 10 at which food and spices can be placed prior to or after cooking. A cylindrical receptacle 24 is formed in the shelf 22 within which to receive and retain a cup, jar or similar container (not shown). A finger port 26 is formed through the shelf 22 to enable the shelf to be grasped and lifted out of the base 7 of cooking stand 3 prior to the combination 5 and grill 10 being manipulated to the collapsed condition of FIG. 3.

Figure 4:
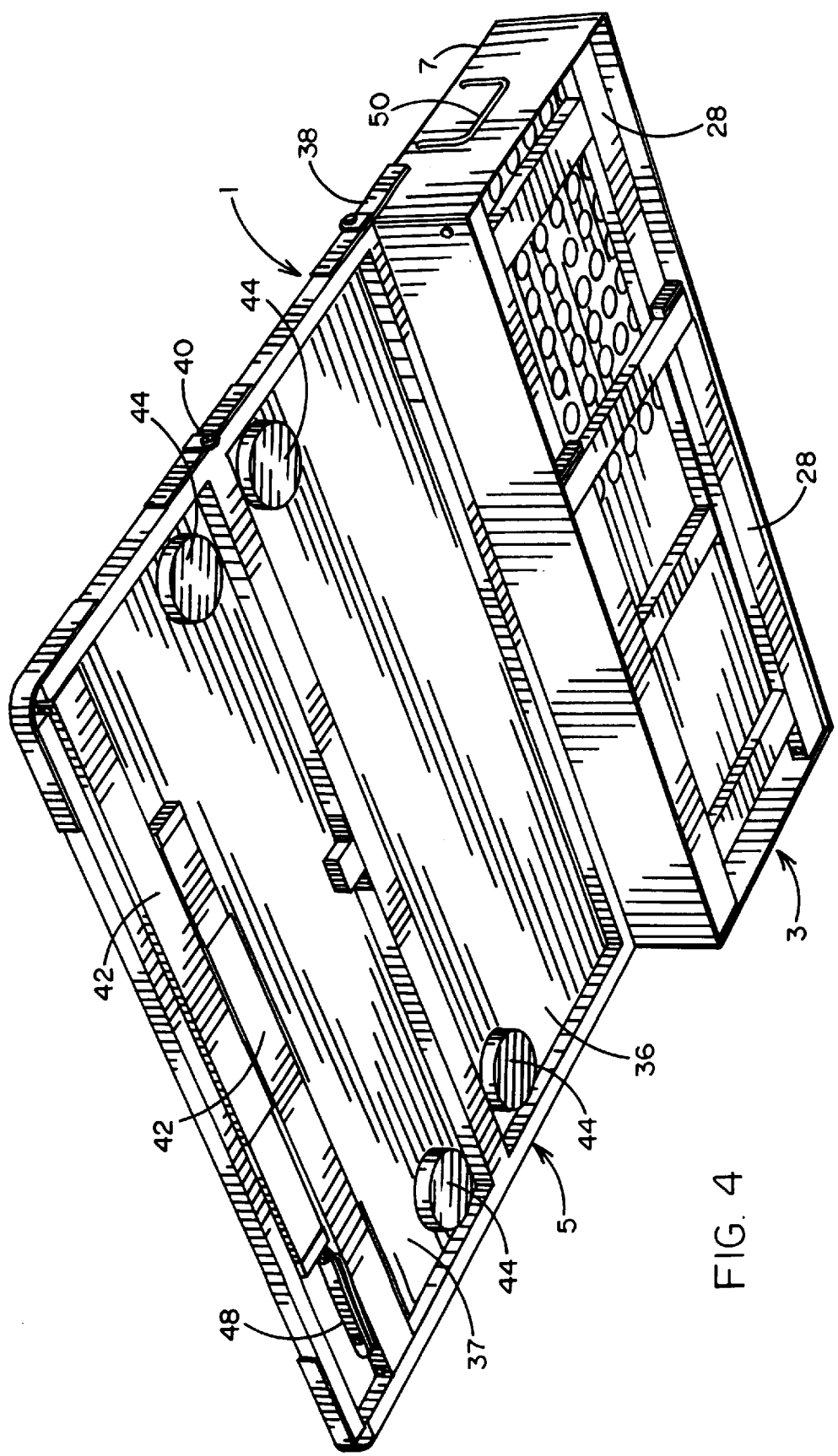

A pair of leg supports 28 are pivotally connected to opposite sides of the cooking stand 3 at the bottom of the base 7. In the example of FIG. 1, each leg support 28 includes a pair of hollow upper legs 29 and 30. A corresponding pair of telescoping leg extensions 31 and 32 are slideably received within respective ones of the hollow legs 29 and 30 and leg supports 28. A first brace 33 extends laterally across the leg supports 28 at the top ends of each pair of upper legs 29 and 30, and a second brace 34 extends laterally across the bottom ends of each pair of leg extensions 31 and 32. When it is desirable to adjust the elevation of the cooking stand 3, the leg extensions 31 and 32 are either pushed inwardly or pulled outwardly from the respective hollow legs 29 and 30. To this end, the adjustable position of the leg extensions 31 and 32 within hollow legs 29 and 30 is maintained by means of a conventional push button actuated fastener (not shown) which projects through the legs 29 and 30 to releasably engage the leg extensions 31 and A conventional folding hinge 35 is connected between the leg supports 28 at each upper leg 29 and 30 and the bottom of the base 7 of cooking stand 3. In this regard, it may be appreciated that the leg supports 28 are adapted for movement through two different planes. That is, when manipulating the combination table 5 and grill 10 to the collapsed condition of FIG. 2, the leg extensions 31 and 32 will first be pushed upwardly and inwardly of their hollow upper legs 29 and 30. Then, the folding hinges 34 will be bent so that the leg supports 28 can be rotated and efficiently stowed below the base 7 of cooking stand 3 (as is best shown in FIG. 4).

Coupled to the cooking stand 3 within which the barbecue grill 10 is removably received is the folding table 5. In the example shown in FIG. 1, the table 5 includes a pair of flat table members 36 and 37 that are held in end-to-end alignment with one another. However, the precise number of table members which are coupled together to form the table 5 can vary and is not to be regarded as a limitation of this invention. The first table member 36 of table 5 is pivotally connected to the back end of the base 7 of the cooking stand 3 by means of hinges 38. The second table member 37 is pivotally connected to the first table member 36 by means of hinges 40 (only one of which being shown). Thus, and as is best shown in FIG. 3, the second table member 37 is adapted to rotate relative to the first table member 36, and the first table member 36 is adapted to rotate relative to the base 7 of cooking stand 3. The advantage of the aforementioned rotatable table members 36 and 37 of folding table 5 will be disclosed in greater detail when describing the manipulation of the combination folding table 5 and barbecue grill 10 to the compact, collapsed condition of FIG. 3.

The folding table 5 is supported above the ground by a pair of leg supports 42. In this regard, a significant advantage of this invention is achieved by holding the table 5 in the deployed condition of combination 1 at a sufficient elevation to permit a plurality of chairs (not shown) to fit below the table members 36 and 37, whereby to enable food that has been cooked on the grill 10 to be consumed by campers who are comfortably seated around the table 5. To this end, a set of cylindrical receptacles 44 are formed in the table members 36 and 37 within which to receive and retain a cup, can, or another container.

Similar to the leg supports 28 which extend below the cooking stand 3, each of the leg supports 42 that support the table 5 includes a hollow upper leg 46 and a telescoping leg extension 47 that is slideably received within a respective hollow leg 46. The elevation of the table 5 can be adjusted to match the elevation of the base 7 of cooking stand 3 by either pushing or pulling the leg extensions 47 inwardly or outwardly of their respective hollow legs 46. A folding hinge 48 similar to the folding hinges 35 of leg supports 28 is connected between the top of the upper legs 46 of leg supports 42 and the bottom of the second table member 37. In this regard, and like the leg supports 28 below cooking stand 3, it may be appreciated that the leg supports 42 below table 5 are adapted for movement through two different planes. That is, when manipulating the combination folding table 5 and grill 10 to the collapsed condition of FIG. 2, the leg extensions 47 will first be pushed upwardly and inwardly of their hollow upper legs 46. Then, the folding hinges 48 will be bent so that the leg supports 42 can be rotated and efficiently stowed below the table member 37 of table 5 (as is best shown in FIG. 4).

Turning now to FIG. 3, after the leg supports 28 and 42 have been rotated to a non-obtrusive location as shown in FIG. 4, the first table member 36 of folding table 5 is rotated around its hinges 38 towards and over the top of the base 7 of cooking stand 3. The second table member 37 is then rotated around its hinges 40 and over the top of the first table member 36, whereby the table members 36 and 37 of folding table are arranged in a space conserving face-to-face alignment one above the other. In the aforementioned space conserving alignment, the leg supports 28 and 42 are neatly stowed between the opposing table members 36 and 37 to complete the process for manipulating the combination 1 to the collapsed condition of FIG. 2.

Figure 2:
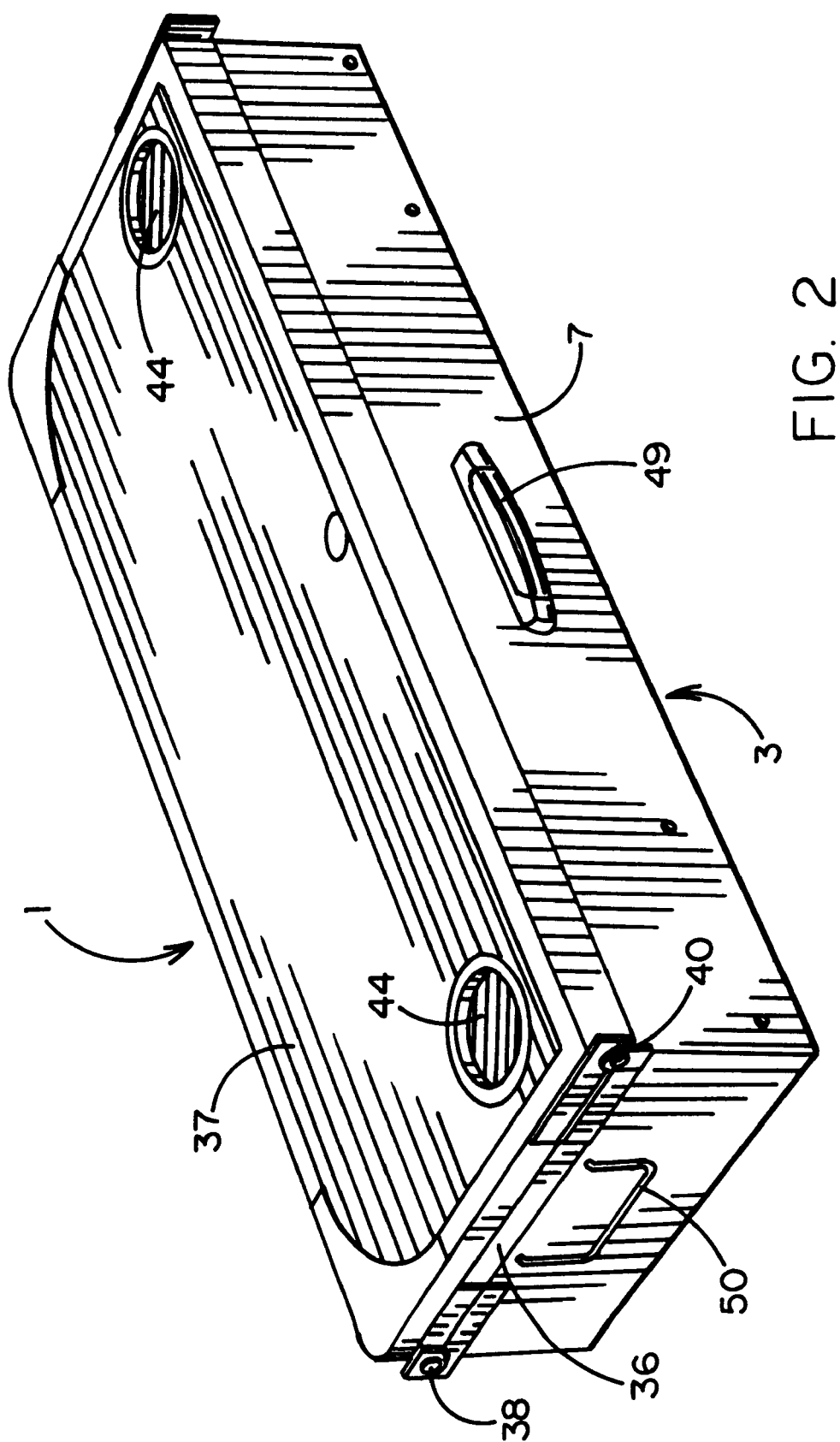
FIG. 2 shows the combination of FIG. 1 after being manipulated to the collapsed condition to form a compact package suitable for transport and storage.
Figure 3:
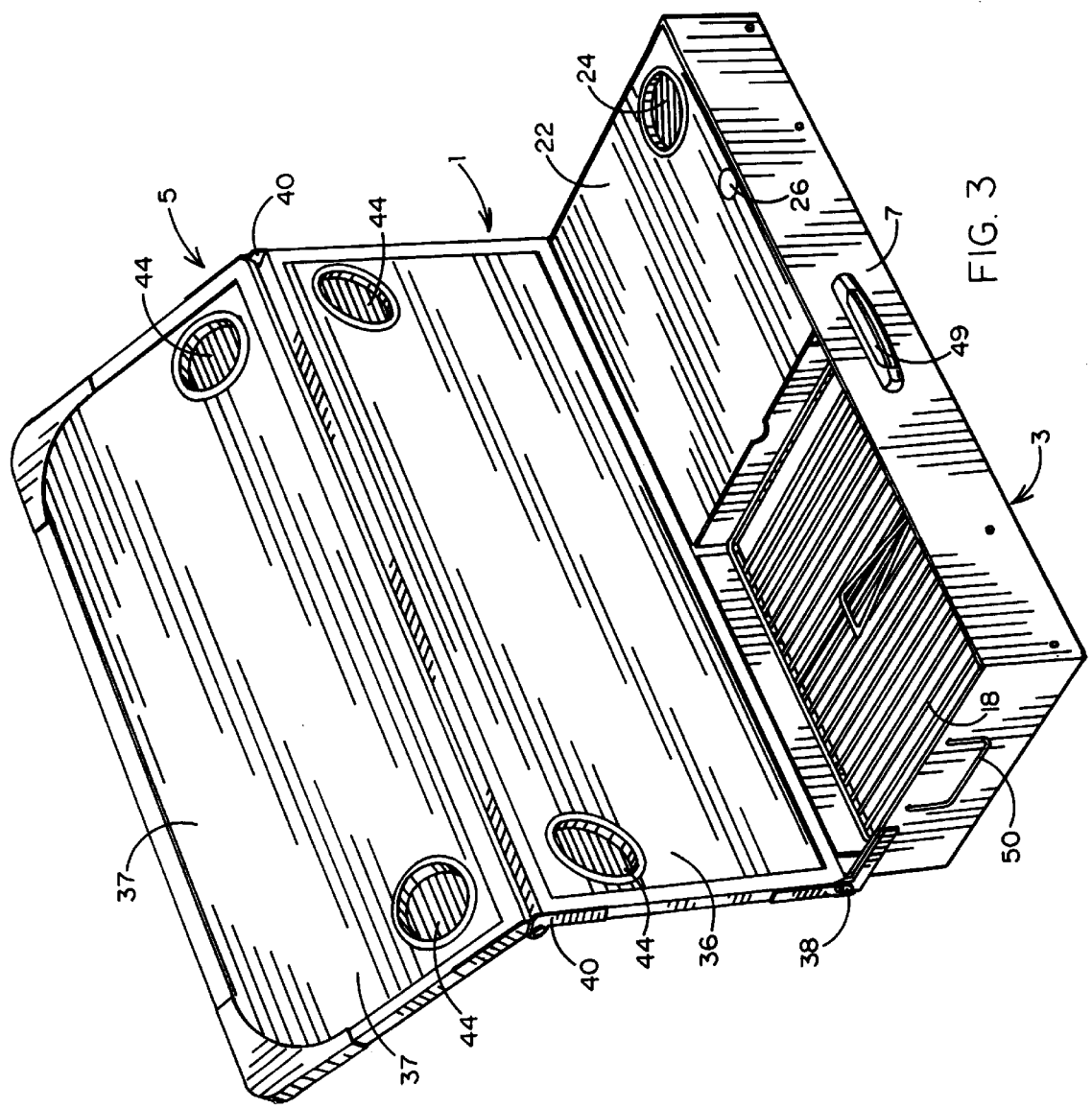
FIGS. 3 and 4 show the combination being manipulated from the deployed condition of FIG. 1 to the collapsed condition of FIG. 2.

In a collapsed condition of FIG. 2, the second table member 37 of the folding table 5 fits snuggly over and completely across the base 7 of the cooking stand 3 to establish a compact package that may now be easily transported in a motor vehicle and stored away to await a return of the combination 1 to the deployed condition. To this end, one or more handles 39 and 50 may be conveniently located around the front and sides of the base 7 to permit the cooking stand 3 to be lifted and carried.

Figure 5:
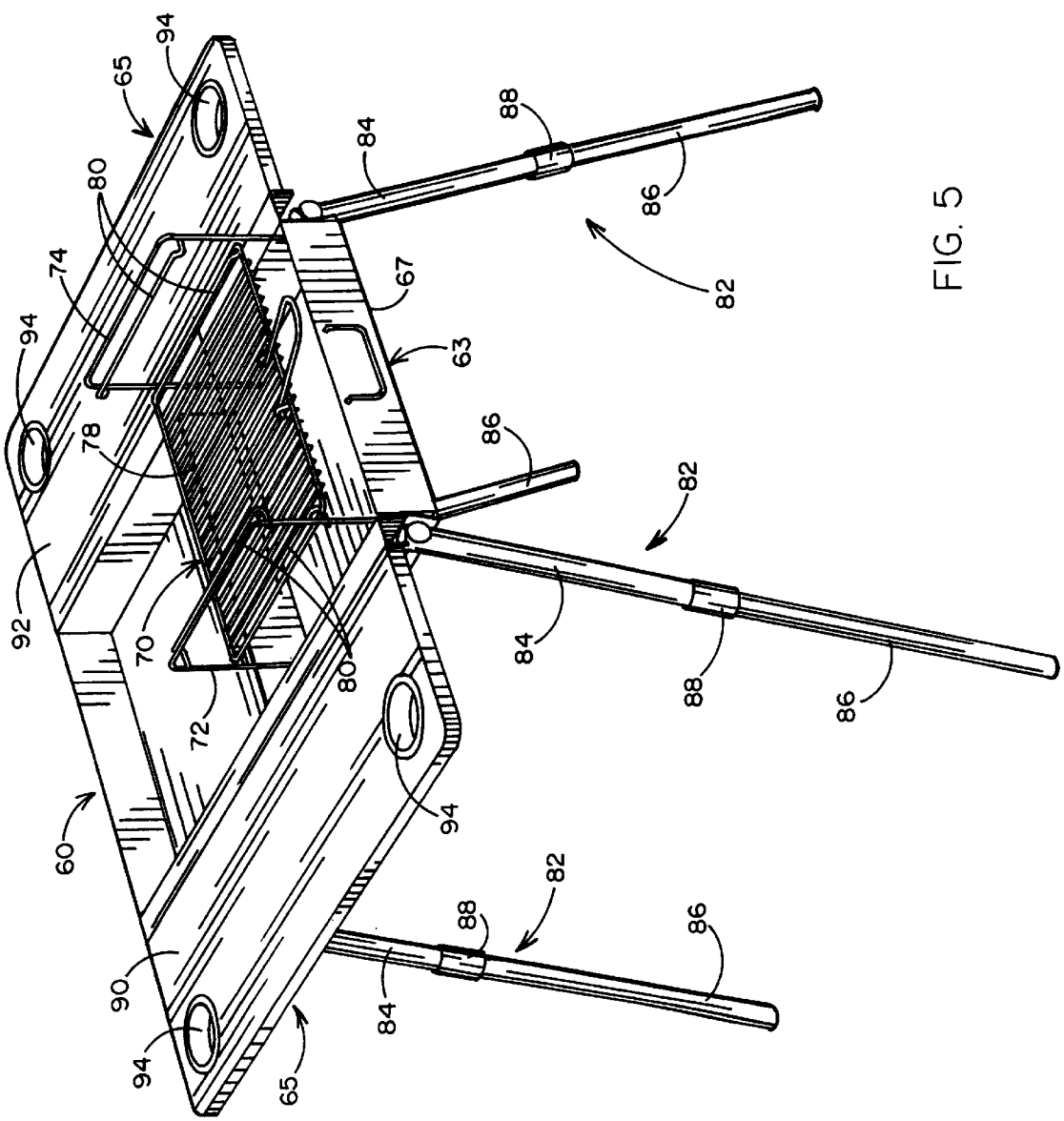
FIG. 5 shows a second embodiment for a combination collapsible barbecue grill and folding table in a deployed condition ready for use.
Figure 6:
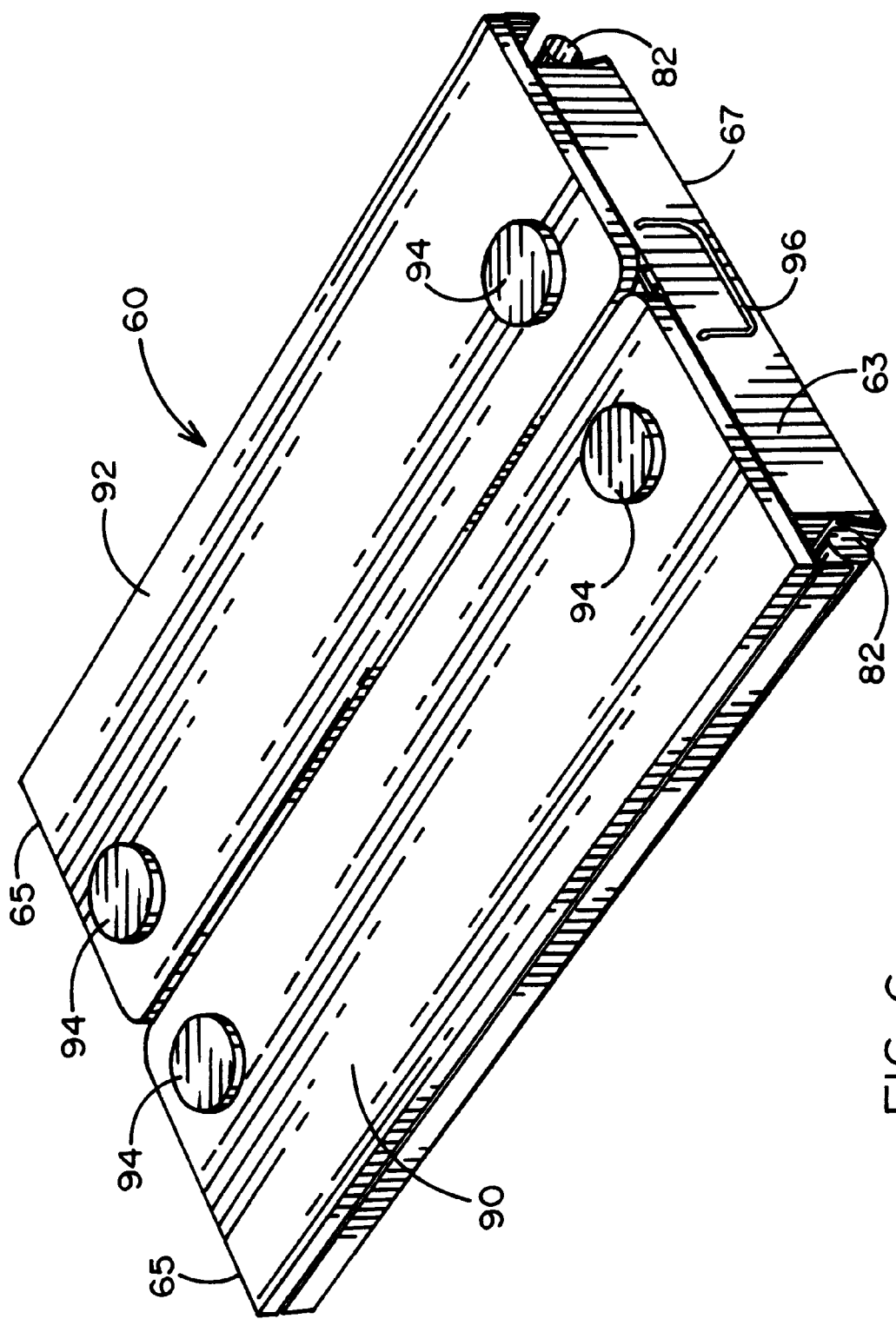
FIG. 6 shows the combination of FIG. 5 after being manipulated to the collapsed condition to form a compact package suitable for transport and storage.
Figure 7:
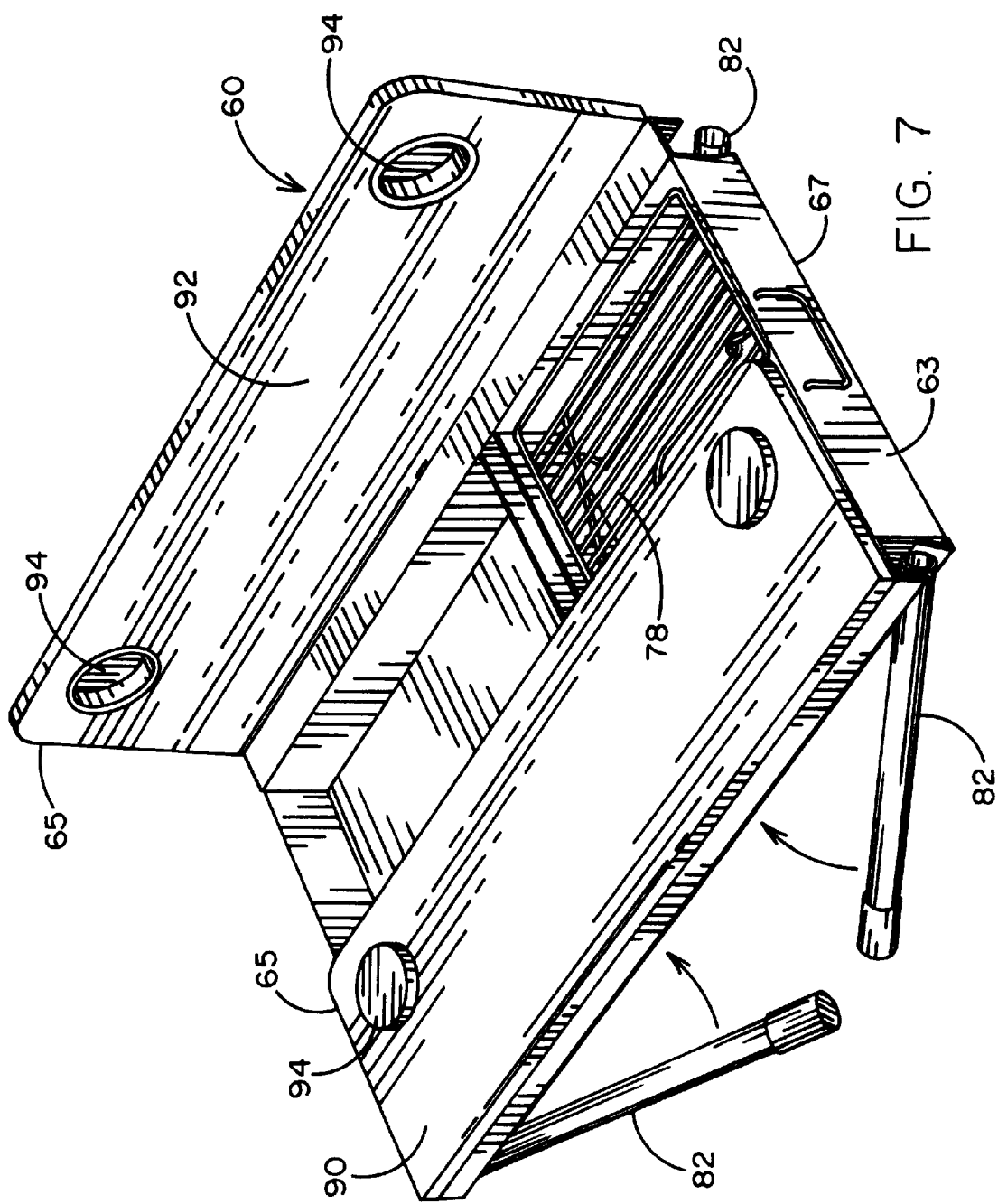
FIG. 7 shows the combination being manipulated from the deployed condition of FIG. 5 to the collapsed condition of FIG. 6.

A second embodiment for a collapsible combination 60 of a folding table 65 and a barbecue grill 70 is described while referring to FIGS. 5–7 of the drawings. Like the combination 1 illustrated at FIGS. 1–4, the combination 60 of FIGS. 5–7 is adapted to be manipulated between the fully deployed condition of FIG. 5 for use at an outdoor environment, where food can be cooked on the grill 70 at a cooking stand 63 and served at an adjacent table 65, and the collapsed condition of FIG. 6, during which the cooking stand 63 and folding table 65 are disposed in a compact package that is suitable for transport and storage.

The cooking stand 63 includes a rectangular base 67 having grilling and food preparation stations at opposite ends thereof In this case, the barbecue grill 70 includes a frame having upstanding side walls 72 and 74. The frame of barbecue grill 70 is seated within the grilling section and upon the bottom 76 of the base 67. The grill 70 also includes a gridiron 78 on which the food to be cooked is laid and grilled. The gridiron 78 is removably attached to an opposing pair of receptacles 80 from a plurality of pairs of receptacles at the opposite side walls 72 and 74 of the grill 70 so as to be held above the bottom 76 of the base 67 of cooking stand 63. The elevation of the gridiron 78 above the base 67 can be varied depending upon the pair of receptacles 80 to which the gridiron 78 is removably attached.

Prior to the combination folding table 65 and barbecue grill 70 of combination 60 being manipulated to the collapsed condition of FIG. 6, the grill 70 is removed from the base 67 of cooking stand 63. That is to say, the frame comprising the side walls 72 and 74 is simply lifted out of the base 67. For purposes of convenience, and as best is shown in FIG. 7, the gridiron 78 may be returned to the base 67 to be carried and stored therewithin when the combination 60 is in the collapsed condition.

A leg support 82 is pivotally connected to each corner of the base 67 of the cooking stand 63 so as to be rotatable along the sides of the base 67. Each leg support 82 includes a hollow upper leg 84. A telescoping lower leg extension 86 is slidably received within a respective hollow upper leg 84 of each leg support 82. When it is desirable to adjust the elevation of the cooking stand 63, the leg extensions 86 are either pushed inwardly or pulled outwardly from their respective hollow legs 84. The adjustable position of each lower leg extension 86 is maintained by means of a conventional rotatable locking sleeve 88 which is tightened around a lower leg extension 86 and an upper leg 84 to prevent the displacement of the leg extension 86 relative to upper leg 84.

Hingedly coupled to the opposite sides of the base 67 of cooking stand 63 above leg supports 82 are respective table members 90 and 92 of the folding table 65. As with the combination 1 illustrated at FIGS. 1–4, a significant advantage of the combination 60 of FIGS. 5–7 is achieved in the deployed condition of FIG. 5 by positioning the cooking stand 63 and the table members 90 and 92 at a sufficient elevation to permit a plurality of chairs (not shown) to fit below the table members, whereby the enable food that has been cooked on the grill 70 to be consumed by campers who are comfortably seated around the table 65. To this end, a set of cylindrical receptacles 94 are formed at the corners of the table members 90 and 92 within which to receive and retain a cup, can, or another container.

Thus, and unlike the combination 1 in the deployed condition of FIG. 1, where the first and second table members 36 and 37 are hingedly connected together at a single side of the base 7 of cooking stand 3, the combination 60 in the deployed condition of FIG. 5 has the pair of table members 90 and 92 hingedly connected to and depending outwardly from opposite sides of the base 67 of cooking stand 63.

Turning now to FIG. 7, the manipulation of the combination folding table 65 and barbecue grill 70 of combination 60 is described to achieve the collapsed condition of FIG. 6 in order to be suitable for transport and storage. That is, at the end of the camping experience, when it is desirable to manipulate the combination 60 to the collapsed condition, the side frame walls 72 and 74 of the grill 70 are first removed from the base 67 of cooking stand 63. Next, the telescoping lower leg extensions 86 of leg supports 82 are pushed upwardly and inwardly into their respective hollow upper legs 84 to enable the opposing pairs of leg supports 82 to be rotated towards one another and disposed along the sides of the base 67 so as to be tucked under table members 90 and 92. Thus, and as illustrated at FIG. 7, all of the leg supports 82 will now be neatly stowed below the folding table 65 alongside the base 67 of cooking stand 63 to facilitate the compact package of FIG. 6.

After the leg supports 82 have been rotated to their positions at the opposite sides of the base 67 as shown in FIG. 6, the first table member 90 of folding table 65 is rotated towards and over the top of a first half of the base 67 of cooking stand 63. The second table member 92 is then rotated over the top of the second half of the base 67 of cooking stand 63. Accordingly, the table members 90 and 92 of folding table 65 are now arranged in a space conserving side-by-side alignment, one adjacent the other, with the leg supports 82 neatly stowed at a non-obtrusive location below the folded table members 90 and 92 so as to complete the process for manipulating the combination 60 to the collapsed condition of FIG. 6.

It may now be appreciated that in the collapsed condition of FIG. 6, the table members 90 and 92 of folding table 65 fit snugly over and completely across the top of the base 67 of the cooking stand 63 to establish the compact package that may now be easily transported in a motor vehicle and stored away to await a return to the deployed condition of FIG. 5. To facilitate transport, a handle 96 may be conveniently located at one or both ends of the base 67 to permit the cooking stand 63 to be lifted and carried.

I claim:
1. In combination:
   a cooking stand including a base having a top, a bottom, a back and a front, a barbecue grill removably received at the top of said base to cook food, and at least a first leg pivotally connected to said base and extending below the bottom thereof to support said base at an elevation above the ground; and
   a folding table on which to eat the food cooked on the barbecue grill, said folding table having a first table member and at least a first leg pivotally connected to said first table member to support said first table member at an elevation above the ground so as to permit a seat to be located under said first table member and a second table member hingedly connected between said first table member and the base of said cooking stand, said second table member adapted to be rotated towards and over the top of the base of said cooking stand, and said first table member adapted to be rotated towards and over said second table member so that said first and second table members are arranged face-to-face one another across the top of the base of said cooking stand.

2. The combination recited in claim 1, wherein said first leg pivotally connected to the base of said cooking stand is adapted to be rotated towards and into opposite facing alignment with the bottom of said base.

3. The combination recited in claim 2, wherein said first leg pivotally connected to the base of said cooking stand has upper and lower telescoping leg portions, said upper and lower telescoping leg portions adapted to be pushed together prior to said first leg being rotated towards and into opposite facing alignment with the bottom of said base.

4. The combination recited in claim 1, wherein said first leg pivotally connected to said first table member has upper and lower telescoping leg portions, said upper and lower telescoping leg portions adapted to be pushed together prior to said first leg being rotated towards and over the top of the base of said cooking stand.

5. The combination recited in claim 1, wherein the first leg of said first table member is rotated into opposite facing alignment with said first table member so as to lie between said first and second table members when said first and second table members are arranged face-to-face one another across the top of the base of said cooking stand.

6. The combination recited in claim 1, wherein said first and second table members of said folding table are hingedly connected end-to-end one another at the back of the base of said cooking stand, and said first leg of said first table member extending below said first table member to support said folding table at the same elevation at which said base is supported.

7. In combination:
a cooking stand including a base having a top, a bottom, and opposite sides, a barbecue grill removably received at the top of said base to cook food, and legs pivotally connected to said base at each of the opposite sides thereof and extending below the bottom of said base in order to support said base at an elevation above the ground; and
a folding table on which to eat the food cooked on the barbecue grill, said folding table having a first table member pivotally connected to one of the opposite sides of the base of said cooking stand and a second table member pivotally connected to the opposite side of the base of said cooking stand, said first table member adapted to be rotated towards and over a first portion of the top of the base of said cooking stand after said barbecue grill is first removed from said base, and said second table member adapted to be rotated towards and over a second portion of the top of the base of said cooking stand after said barbecue grill is removed, whereby said first and second table members are arranged side-by-side one another across the top of said base, said legs adapted to be rotated along the opposite sides of said base of said cooking stand to which said legs are connected so as to lie below said first and second table members.

8. In combination:
a cooking stand including a base having a top, a bottom, and opposite sides, a barbecue grill located at the top of said base to cook food, and legs pivotally connected to the cooking stand at said base and extending below the bottom of said base in order to support said base at an elevation above the ground; and
a folding table on which to eat the food cooked on the barbecue grill, said folding table having a first table member pivotally connected to one of the opposite sides of the base of said cooking stand and a second table member pivotally connected to the opposite side of the base of said cooking stand, said first table member adapted to be rotated towards and over a first portion of the top of the base of said cooking stand and said second table member adapted to be rotated towards and over a second portion of the top of the base of said cooking stand, whereby said first and second table members are arranged side-by-side one another across the top of said base, said legs adapted to be rotated relative to the base of said cooking stand so as to lie against said base and below said first and second table members.

9. In combination:
a cooking stand including a base having a top and a bottom, a barbecue grill removably received at the top of said base to cook food, and at least one leg pivotally connected to said base and extending below the bottom thereof to support said base at an elevation above the ground; and
a folding table on which to eat the food cooked on the barbecue grill, said folding table having a first table member hingedly connected to the base of said cooking stand, a second table member hingedly connected to said first table member, and at least one leg pivotally connected to said second table member to support said second table member above the ground,
said at least one leg pivotally connected to said base adapted to be rotated towards and against the bottom of said base, and said at least one leg pivotally connected to said second table member adapted to be rotated towards and into opposite facing alignment with said second table member,
said first table member adapted to be rotated towards and over the top of the base of said cooking stand after the barbecue grill has been removed from said base, and said second table member adapted to be rotated towards and over said first table member so that said first and second table members are arranged face-to-face one another across the top of the base of said cooking stand.

* * * * *